(12) United States Patent
Pyotsia et al.

(10) Patent No.: US 7,010,294 B1
(45) Date of Patent: Mar. 7, 2006

(54) WIRELESS CONTROL OF A FIELD DEVICE IN AN INDUSTRIAL PROCESS

(75) Inventors: Jouni Pyotsia, Helsinki (FI); Markku Simula, Helsinki (FI); Harri Cederlof, Espoo (FI)

(73) Assignee: Metso Automation Oy, Helsinki (FI)

( * ) Notice: Subject to any disclaimer, the term of this patent is extended or adjusted under 35 U.S.C. 154(b) by 0 days.

(21) Appl. No.: 09/550,311

(22) Filed: Apr. 14, 2000

(30) Foreign Application Priority Data

Apr. 16, 1999 (FI) ...................................... 990864

(51) Int. Cl.
*H04M 3/00* (2006.01)

(52) U.S. Cl. .................. 455/420; 455/422.1; 455/90.3; 455/3.03; 702/188; 700/17; 700/65; 700/83; 715/735; 715/736; 715/737; 715/740; 715/854; 715/864; 709/203; 709/206; 709/219; 340/3.1; 340/3.71; 340/3.9

(58) Field of Classification Search .................. 700/17, 700/65, 83, 264, 2, 9; 345/734–740, 853, 345/854, 864, 744, 746; 340/3.1, 3.9, 3.71; 455/3.01, 3.03, 423, 425, 68, 88, 90.3, 420, 455/422.1; 702/188; 715/734–740, 853, 715/854, 864, 744, 746; 709/217, 219, 203, 709/206, 313, 329

See application file for complete search history.

(56) References Cited

U.S. PATENT DOCUMENTS

| | | | | |
|---|---|---|---|---|
| 5,640,153 | A | 6/1997 | Hildebrand et al. ......... 340/7.1 |
| 5,793,693 | A | 8/1998 | Collins et al. ......... 365/230.01 |
| 5,793,963 | A * | 8/1998 | Tapperson et al. .......... 709/201 |
| 5,956,487 | A * | 9/1999 | Venkatraman et al. ...... 709/218 |
| 6,020,881 | A * | 2/2000 | Naughton et al. .......... 345/740 |
| 6,061,603 | A * | 5/2000 | Papadopoulos et al. ....... 700/83 |
| 6,098,067 | A * | 8/2000 | Erickson ...................... 707/10 |
| 6,139,177 | A * | 10/2000 | Venkatraman et al. ........ 700/83 |
| 6,154,658 | A * | 11/2000 | Caci ........................... 455/466 |
| 6,363,419 | B1 * | 3/2002 | Martin et al. ............... 709/219 |
| 6,415,245 | B1 * | 7/2002 | Williams et al. ............ 702/188 |
| 6,421,716 | B1 * | 7/2002 | Eldridge et al. ............ 709/219 |
| 6,460,060 | B1 * | 10/2002 | Maddalozzo et al. ....... 715/513 |
| 6,549,773 | B1 * | 4/2003 | Linden et al. ............ 455/426.1 |
| 6,560,640 | B1 * | 5/2003 | Smethers .................... 709/219 |
| 6,674,363 | B1 * | 1/2004 | Bartelheim et al. ...... 340/539.1 |
| 2001/0012024 | A1 * | 8/2001 | Rosin et al. ................. 345/841 |
| 2002/0019709 | A1 * | 2/2002 | Segal .......................... 702/45 |

(Continued)

FOREIGN PATENT DOCUMENTS

DE 197 24 901 12/1998

(Continued)

*Primary Examiner*—Anthony Knight
*Assistant Examiner*—Crystal J. Barnes
(74) *Attorney, Agent, or Firm*—Pillsbury Winthrop Shaw Pittman, LLP

(57) ABSTRACT

A mobile terminal is arranged to communicate over a cellular communication system with a control system connected to a plurality of field devices in an industrial process, in order to remote control, configure or monitor the field devices. The mobile terminal accesses through a dedicated data connection established over the cellular communication system an interactive user interface associated with the control system and arranged to utilize the configuration, control and management data of the control system. In the preferred embodiment, the interactive user interface is provided by a World Wide Web server.

13 Claims, 3 Drawing Sheets

U.S. PATENT DOCUMENTS

| | | | |
|---|---|---|---|
| 2002/0019725 A1 * | 2/2002 | Petite | 702/188 |
| 2002/0046290 A1 * | 4/2002 | Andersson et al. | 709/237 |
| 2002/0049565 A1 * | 4/2002 | Kirila et al. | 702/188 |
| 2002/0049637 A1 * | 4/2002 | Harman et al. | 705/26 |
| 2002/0130846 A1 * | 9/2002 | Nixon et al. | 345/169 |
| 2003/0204373 A1 * | 10/2003 | Zielinski et al. | 702/184 |
| 2005/0122232 A1 * | 6/2005 | DeGroot | 340/870.2 |
| 2005/0130605 A1 * | 6/2005 | Karschnia et al. | 455/90.3 |

FOREIGN PATENT DOCUMENTS

| | | |
|---|---|---|
| DE | 197 30 363 | 1/1999 |
| DE | 10252277 A1 * | 5/2004 |
| DE | 10248152 A1 * | 6/2004 |
| EP | 825 506 | 2/1998 |
| EP | 825506 A2 * | 2/1998 |
| JP | 2003134261 A * | 5/2003 |
| WO | WO 99/07128 * | 2/1999 |

* cited by examiner

WIRELESS CONTROL OF A FIELD DEVICE IN AN INDUSTRIAL PROCESS

FIELD OF THE INVENTION

The present invention relates to a control and management systems of industrial processes, and particularly to a wireless configuration, management and control of field devices.

BACKGROUND OF THE INVENTION

Field devices for industrial processes generally signify regulating devices, control devices, sensors, transducers, and the like, directly connected to the process. A typical field device is a control valve provided with a valve controller, such as the valve controller ND800 of Neles Controls Oy. So-called intelligent field devices are provided with a control logic and software, which make it possible to control the field device locally for instance by means of a suitable control algorithm, to collect status and measurement data and/or to communicate with an automation system or a field device management system.

FIG. 1 illustrates a general diagram of a process automation system and an associated maintenance management system of field devices. The automation system comprises control room programs and databases 11 as well as process control programs and an I/O part 12. Traditionally, the field devices have been connected to the control system by two-wired twisted pair loops, each device being connected to the control system by a single twisted pair providing a 4–20 mA analog input signal. More recently, new solutions, such as Highway Addressable Remote Transducers (HART) protocol, that allow to transmit digital data together with conventional 4 to 20 mA analog signal in the twisted pair loop, have been used in the control systems. In the most recent phase of evolution, a field control system (FCS) has been introduced which employs a totally digital high-speed network or data bus for interconnecting the control room computer and the field devices. The analog switched pair loops are omitted in the FCS. A new communication protocol is generally referred to as fieldbus have been defined by the Instrument Society of America (ISA). With reference to the architecture illustrated in FIG. 1, the control and I/O part 12 is connected via HART buses to intelligent field devices, such as control valves 14, 15, 16 and valve controllers 14A, 15A, 16A. HART enables a two-way communication, by means of which the intelligent field devices can be controlled, configured and monitored. The HART protocol is described in greater detail for instance in the publication HART field communication protocol: An introduction for users and manufacturers, HART Communication Foundation, 1995. Again with reference to FIG. 1, field devices are monitored by a field device management system 10 which collects data from the field devices. For this purpose, each field device 14, 15 and 16 is connected via respective field bus to a conventional HART multiplexer 9, which again is connected via an RS-485 bus 8 to a PC 6. It should be appreciated that the architecture shown in FIG. 1 is only one example of possible control and management system architectures. For example, the field device management system may be partially or totally integrated into the automation system. However, as the field devices are typically supplied by different manufacturers than the automation system, the diagnostics of the field device is normally an area belonging to the field device supplier and not to the supplier of the actual automation system, and therefore, very often separate management systems are provided.

Therefore, at least in some automation and field device management systems intelligent field devices can be configured, controlled, and/or monitored by the operator of the plant from the control room. However, it is desired that also the maintenance personnel in different locations in the plant are capable of monitoring, configuring and controlling the field devices. A prior art approach is to provide the maintenance personal with special purpose communicator for configuration of the field devices, such as a hand-held HART communicator which can be connected to the HART bus via special purpose configuration ports.

Another approach is disclosed in U.S. Pat. No. 5,793,693, wherein each field device is provided with a wireless field bus port that is accessible by wireless hand-held unit or wireless terminal in order to obtain non-redundant secondary access to a field device that is controlled by a control room. This approach avoids the need for physical connection to the field bus or the field device but still requires a special-purpose communicator and a dedicated control software for each different type of field devices.

A still another approach is a GSM-control concept provided by Klinkmann, Finland. GSM control is a PC (Personal Computer) software which allows to use standard low-cost GSM cellular phones as two-way remote controllers. A GSM modem is connected to the PC by a RS232 serial port. The communication between the GSM phone and the GSM modem is a standard SMS (Short-Message-Service) communication via a public GSM network which enables a transfer of text messages between the GSM phone and the GSM control program running in the PC. The GSM control software can be connected to other windows programs and software. This GSM control approach might be suitable also for controlling and managing field devices in an industrial process. The benefit would be that standard cellular phones can be used instead of special purpose diagnostic terminals. However, the communication based on SMS messages transmitted via a public GSM network is not reliable enough for controlling industrial processes. The transfer times of the short messages may vary from seconds to hours, and the messages may even be lost without ever reaching the recipient, due to the traffic load variation in the SMS centres and the GSM network involved. This results in intolerable response times from inputting a control command by the maintenance person at the cellular phone until the command is received and performed by the automation system or the field device. The maintenance person cannot even be sure whether the message is received or not. Therefore, the user of the standard SMS concept of the GSM system is not suitable for control and configuration of field devices in an industrial process.

A further problem relating to the known GSM control concept is a complicated management of various interrelated data, such as users, phone numbers, passwords, DDE addresses, read messages, write messages, alarm/event messages, default messages, etc. According to a current specification this data is linked with each other according to the following hierarchy: at the highest level there are configured users, each user being able to have several phone numbers and passwords. For each passwords there are pointers to corresponding read, write, alarm/event or text messages. These messages are further linked with appropriate DDE addresses. In an industrial process there may be hundreds of field devices, and therefore it will be in practice impossible for a maintenance person to cope with this information and to easily and efficiently make the control procedures. Further, it is difficult to maintain the information updated.

DISCLOSURE OF THE INVENTION

An object of the invention is to enable a remote control, configuration or monitoring of field devices by a general purpose mobile terminal while avoiding or alleviating the above described problems.

An aspect of the present invention is a control system for controlling configuring or monitoring field devices in an industrial process, said control system being connected to a plurality of field devices and comprising at least one mobile terminal arranged to communicate with the control system over a cellular communication system in order to selectively remotely control, configure or monitor the field devices. The control system comprises an interactive user interface associated with the control system and arranged to utilize the configuration, control and management data of the control system and accessible by the mobile terminal through a dedicated data connection established over the cellular communication system, in order to selectively control, configure or monitor the field devices connected to the control system.

In accordance with the basic principle of the present invention a direct on-line-type connection is established from the mobile terminal through a cellular communication network, and possible other transit communication networks, to a field device control system which is connected to the field devices in the industrial process or plant. The on-line connection may be any virtual, packet switched or circuit switched connection or a combination thereof which provides an adequate quality of service (QoS), at least with respect to the transmission delay and reliability. In response to the control provided over the on-line connection the actual field device control system controls the addressed field device according to the protocols used in the field device control system. As a result, it can be said that there is an on-line connection from the controlling mobile terminal to the controlled field device so that the reliable and safe control of the field device with a very short response time is achieved, which allows the remote control and configuration of the field device in any situation, such as an emergency.

According to another feature of the invention the field device control system is provided with a interactive user interface which is accessible by the mobile terminal through the on-line data connection over the cellular communication system. The interactive user interface is preferably using an open protocol which is accessible by a general-purpose mobile terminal. The content of the interactive user interface, i.e. the information sent to the mobile terminal as well as the field device specific control data inputted to the control system from the user interface is built up using the configuration, control and management data available in the control system. This enables that the content of the user interface is always updated with the control system and the process. In practice, the content of the user interface may be created by using same database(s) as the control system. The interactive user interface may be further arranged to modify the content of the interactive user interface in response to requests or selections made by the mobile terminal and in base of the configuration, control and management data rate retrieved from the control system, and to create control or configuration commands to the control system in response to selections or inputs made by the mobile terminal user in the interactive user interface. This results in very simple yet reliable control procedures in the user point of view.

In a preferred embodiment of the invention the interactive user interface is provided by a WWW (World Wide Web) server associated with the control system. The mobile terminal sets up a data connection over the cellular communication system to an internet access point (IAP), which is an internet access server (proxy) gateway of a public internet service provider or an internet/intranet access server of the plant or a private company, for example. The gateway communicates over the intranet/internet with the WWW server providing the interactive user interface. The interactive user interface is a WWW page or a set of WWW pages. The content of the WWW page is created based on the control, configuration or management data retrieved from the control system. The mobile terminal comprises a browser which enables to retrieve the content of the interactive WWW page to the mobile terminal and display it to the user. The browser also enables the user to make selections and/or to input information on the interactive WWW page. The content of the WWW page may be converted between the normal WWW format and a second WWW format requiring less data transmission capacity in the radio interface and a smaller display. The second WWW format may be the one used in a wireless application protocol (WAP) defined for mobile communication systems. The conversion is preferably carried out in the gateway. It is, however, also possible that the content of the WWW page is, at least partially, in said second format.

Embodying the interactive user interface as a WWW page provides an informative and easy-to-use interface for controlling the field devices. It also provides means for transferring various types of information, such as text, graphics, i.e.

In accordance with a still further embodiment of the invention the WWW server is arranged to assist the selection of the desired field device by providing a hierarchic set of WWW pages representing a logical, functional or location architecture of the plant in a tree configuration. Each hierarchic level provides a user with information of different routes which can be selected on a lower level. Thereby the user of the mobile terminal is able to proceed from the higher hierarchy level to a lower one until a WWW page for a desired field device is found. A field device is preferably identified by a tag number of the field device which is also used in the control system and in the plant.

In a still another embodiment of the invention the WWW server is provided with a search function which in response to an identity of a field device, such as the tag number, sent by the mobile terminal searches the WWW page for the respective field device. If a truncated or ambiguous identity is sent by the mobile terminal, a search function may be arranged to display a list of field devices to which the truncated or ambiguous identity matches, so that the user is able to select the desired one.

BRIEF DESCRIPTION OF THE DRAWINGS

The invention will now be described in more detail by means of preferred embodiments, with reference to the attached drawings, in which.

PREFERRED EMBODIMENTS OF THE INVENTION

The present invention can be applied to any industrial process or the like comprising an automation, control or diagnostic system and intelligent field devices. Intelligent field device signify here any device relating to a process or an automated system or a control thereof which shall be controlled and/or is capable of producing diagnostic data. A typical intelligent field device is a control valve with a valve controller.

Figure 1:
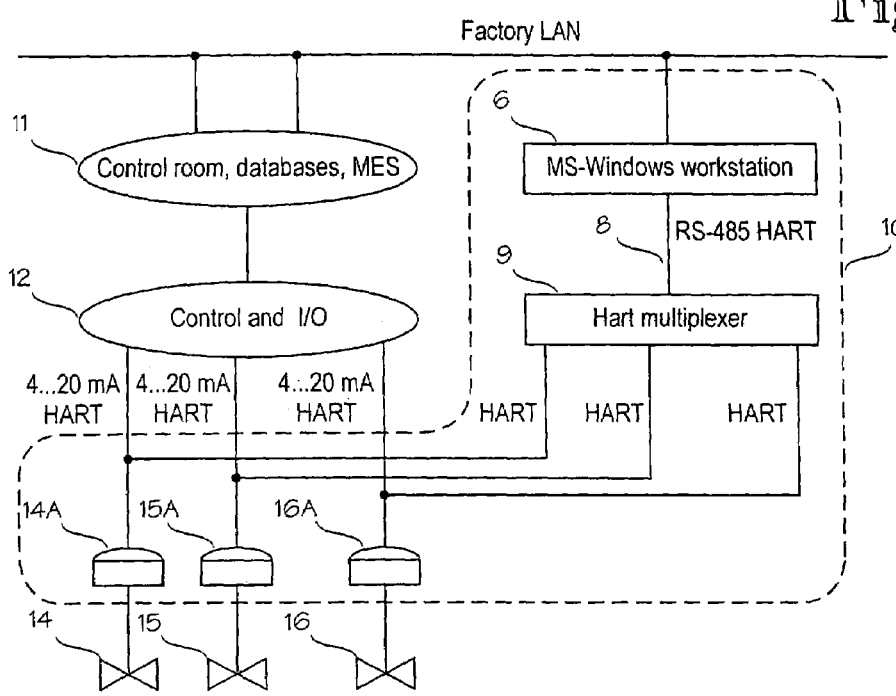
FIG. 1 illustrates the process automation systems and a field device maintenance management system in which the invention be applied.
Figure 2:
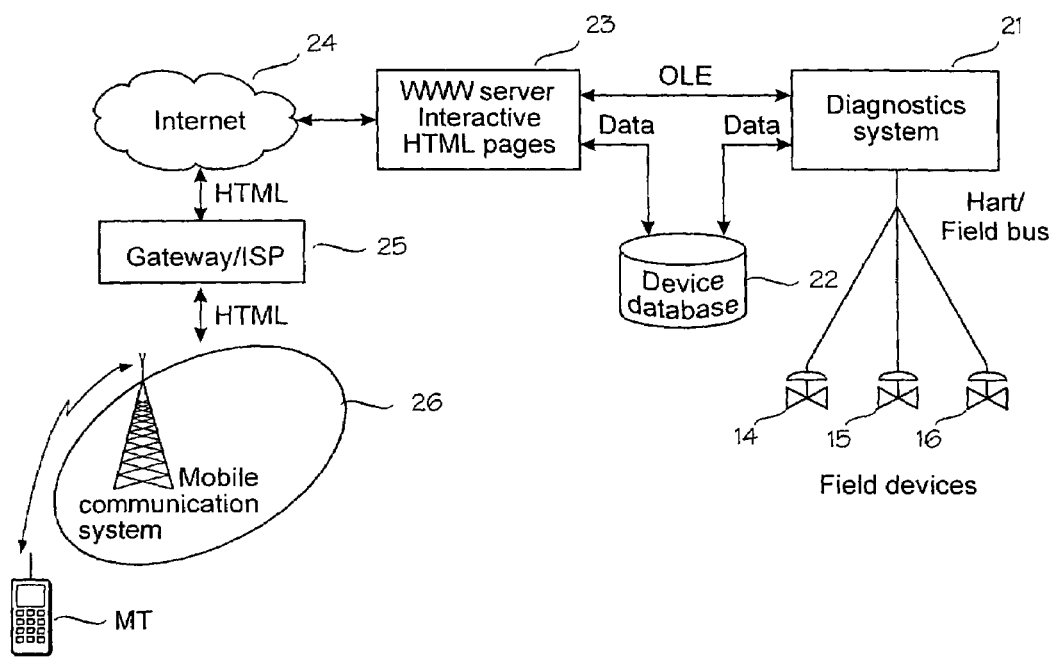
FIGS. 2 and 3 illustrates the embodiments of the invention in which the interactive user interface is realized by means of interactive HTML pages.

With reference to FIG. 2, a diagnostic system 21 may be any automation system, such as automation system 11 and 12 in FIG. 1, or any field device management or control system, such as the management system 10 in FIG. 1, or combination thereof. A characteristic feature of the diagnostic system is that it comprises a wired connection, such as a field bus or a HART bus, to field devices 14, 15 and 16, and is able to control or configure the field devices, or to read measurement or status data from the field devices. For this purpose, the diagnostic system 21 comprises a management and control software for the field devices. In the preferred embodiment each field device type (e.g. two different control valves or control valves of different manufacturers may represent different device types) is provided with a specific control software which contains all necessary data and instructions sets for controlling, configuring, reading, etc., the field devices of a predetermined time. Normally these operations can be made by a control room personnel from a work station. A device database 22 stores information on each field device controlled by the diagnostic system 21 and, preferably, all diagnostics data read from the field devices. In other words, the database 22 contain an updated configuration of field devices as well as the operation history thereof.

In accordance to the principles of the present invention, the diagnostic system 21 is further provided with an interactive user interface which utilize the configuration, control and management data in the database 22 and is accessible by the mobile terminal MT through a dedicated data connection established over the cellular communication system 26, in order to selectively control, configure or monitor the field devices 14, 15 and 16 connected to the diagnostic system 21. In the preferred embodiment of the invention the interactive user interface is embodied as one or more world wide web (WWW) pages in a WWW server 23.

As well known in the art of communication, the Internet world-wide web (WWW) architecture provides a very flexible and powerful programming model. Applications and contents are presented in standard data formats, the most commonly used format being the HyperText Markupf Language (HTML). The WWW pages are browsed by applications known as web browsers. The web browser is a network application, i.e., it send requests for named data objects to a WWW server and the WWW server responses with the data encoded using the standard formats (such as HTML). Also standard networking protocols are used for allowing any web browser to communicate with any WWW server, the most commonly used protocol being the HyperText Transfer Protocol (HTTP). The Internet 24 is a set of interconnected TCP/IP networks, as well known in the art. Private TCP/IP networks are also called Intranets.

In FIG. 2 the mobile terminal MT establishes a data connection to the gateway or proxy 25, which is connected to the internet/intranet 24. Gateway 25 may be an internet access server of a public internet service provider (ISP) such as Euronet, or a private internet access point. In any case, the connection established via the mobile communication system 26 between the mobile terminal MT and the gateway 25 may be any data or modem connection utilized for internet access in the mobile communications systems. The mobile terminal MT is provided with an internet browser, which is capable to send requests to the gateway and to receive and process the WWW contents received from the gateway 25. The gateway 25 acts as an intermediary client for the purpose of making requests on behalf of the mobile terminal MT. A gateway 25 forwards the requests received from the mobile terminal MT to the WWW server 23 via the internet 24 according to the standard internet protocols. The WWW server 23 responses to the requests by sending the requested WWW pages to the gateway 25 which forwards the WWW pages to the browser in the mobile terminal MT. The gateway 25 may also include translation or conversion between different content formats or protocols as will be explained in more detail below. In the mobile terminal MT the browser displays the retrieved WWW pages to the user on the display of the MT. In other words, the connection and communication between the mobile terminal MT and the inventive WWW server 23 may be similar to any conventional or future internet connection from a mobile terminal to a WWW server. Also the mobile terminal may be any terminal equipment with a internet capability, such as a mobile phone, a mobile phone connected to a computer, a data terminal equipment provided with a mobile communication capability, etc. The data connection between the mobile terminal and a gateway 25 may be a circuit switched connection, a packet switched connection, a virtual connection (such as asynchronous transfer mode, ATM), etc. The only requirement is that the data connection provides a sufficient quality of service (QoS), especially in the transmission delay and reliability point of view.

At present, the most promising method for providing a standard mobile terminal MT with a internet capability is a Wireless Application Protocol, WAP, defined by the Wireless Application Protocol Forum. WAP specifies an application framework and network protocols for wireless devices, such as mobile telephones, pagers and personal digital assistance (PDAs). The specifications extend mobile networking technologies (such as digital networking standards) and internet technologies (such as XML, URLs, Scripting, and various content formats). WAP defines a set of standard components that enable communication between mobile terminals and WWW servers. WAP content and applications are specified in a set of well-known content formats based on familiar WWW content formats. The most common WAP content format will be Wireless Markup Language, WML, which is a language very similar to HTML and used to create WAP pages that can be displayed in a WAP browser, i.e. micro browser in the wireless terminal which is analogous to the standard web browser. The WAP content types and protocols have been optimized for mass market, hand-held wireless devices.

Figure 3:
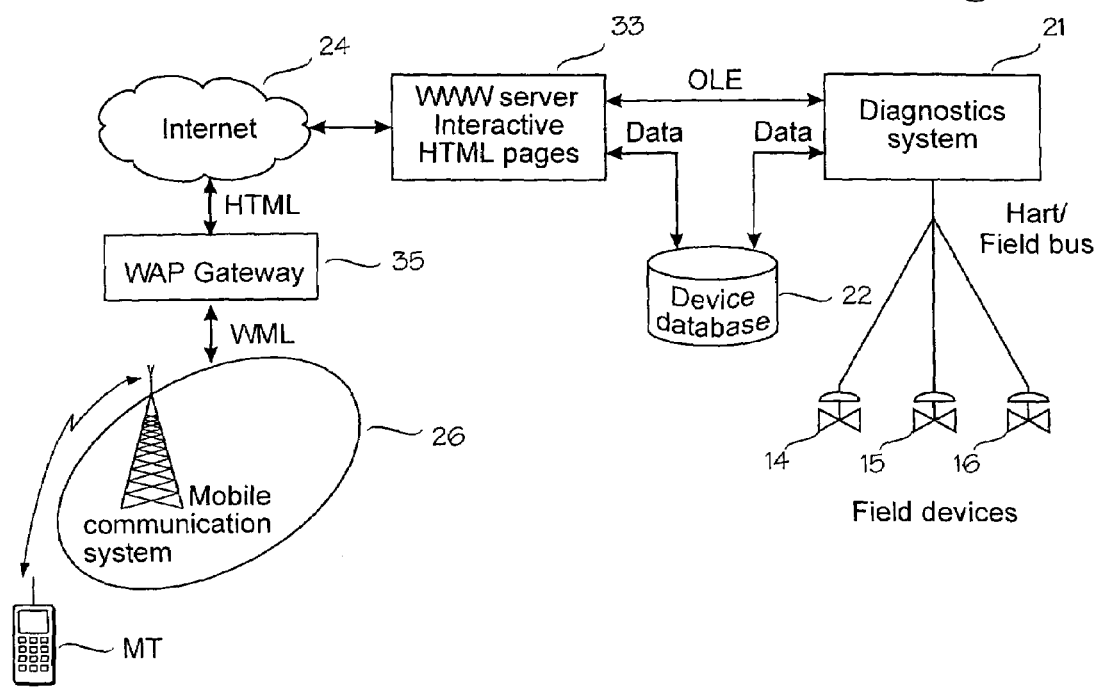

FIG. 3 illustrates the wireless control arrangement according to the present invention when using the WAP. The diagnostic system 21, device database 22 as well as the WWW server 33 may be similar to those described with reference to FIG. 2. However, content of WWW pages may be created so that the use of WAP and WML is taken into account, e.g. by providing simple WWW pages with the HTML language or by using the WML language in the WWW pages. The mobile terminal MT is provided with a WAP micro browser, whereas the data connection through the mobile communication network 26 is similar to that in FIG. 2. A WAP gateway 35 provides a connection between the mobile communication network 26 and the WWW technology in the internet 24. Firstly, the WAP gateway 35 translates WAP requests to WWW requests thereby allowing the WAP micro browser in the mobile terminal MT to submit requests to the WWW server 33. The WAP gateway 35 also translates the responses from the WWW server 33 into a format understood by the micro browser in the MT. If the WWW server 33 provides a WAP content (e.g., WML), the WAP gateway 35 retrieves it directly from the WWW server and forwards it to the MT. However, if the WWW server 33 provides a WWW content (such as HTML), the WAP gateway 35 (or a separate filter unit) translates the WWW content (e.g., HTML) into a WAP content (e.g., WML). This translation is also called filtering since it often extracts the essential parts of the WWW content for translation. A further advantage of the WAP is that it inherently provides a connection security between the MT and the WWW server 33. The security and the authentication of the user is especially important when the inventive arrangement is used for configuration and control of the field devices. As the configuration and control commands will affect on the operation of the plant, a system according to the invention has to assure that the user is an authorized user. It may also be possible to create a WWW server 33 that includes the WAP gateway functionality 35, in order to facilitate end-to-end security solutions, or to achieve better access control or a guarantee of responsiveness.

The WWW server 23 and 33 utilizes the data in the device database 22 for creating the interactive WWW pages for browsing the data and for control and configuration of the field devices. As the server 23 or 33 uses the same database with the diagnostic system 21, the contents of the WWW pages are always up-to-date. The mobile terminal MT is able to browse the diagnostic and configuration data in the device database 22 by means of the interactive WWW pages. In response to the requests and selections made by the user in the interactive WWW pages the WWW server 23 makes inquiries to the device database 22, and a new WWW page is created according to the data obtained from the database 22. The created WWW page may include diagnostic data, status and an operation history data of the selected field device, as well as information required for controlling and configuring the field device. According to the user's selections an appropriate piece of data is shown in the WWW page in text format, graphical format and/or in any other suitable format, together with the fields or links for making further selections or commands. The server 23 or 33 translates the configuration or control commands made by the user in the interactive WWW page into configuration commands used in the interface between the WWW server 23 or 33 and the diagnostic system 21, typically based on the information obtained from the database 22. The interface between the server 23 and the diagnostic system 21 may be OLE (Object Linking and Embedding) The diagnostic system 21 forwards the control and configuration commands received from the server 23 or 33 to the field devices, typically upon translating the generic commands into the device specific instructions. As a result, an "on-line" connection from the mobile terminal MT to the field device is provided.

By means of the inventive interactive user interface and the "on-line" connection, the maintenance personnel is able to retrieve information on the operation of a desired field device, such as a control valve, and display it on the user interface of the mobile terminal. The information may be displayed in a text format and/or graphical format. The information may also include alarms and any operation parameters which the maintenance person wishes to monitor on-line, such as the opening of a valve. The operational data obtained by the mobile terminal MT allows the maintenance person to immediately make a decision on the maintenance need of the respective field device, i.e. whether it is possible to postpone the maintenance operation up to the next shut down of the plant or whether special arrangements are needed in order to avoid an unintentional shutdown. During the shutdown of the plant the mobile terminal can be used for performing various field test for the field device, such as a step response test or a hystheresis test for a control valve. Also during the operation of the plant the diagnostic system 21 may allow the mobile terminal to perform a forced control of the field device to a desired mode of operation or position.

As noted above, the mobile terminal MT may be a standard mobile phone or similar device with a relatively small display. Due to the small display the clarity of the interactive user interface as well as easiness to use are important features. One of the primary problems is how to find and select the desired field device among a plurality of field devices.

Figure 4A:
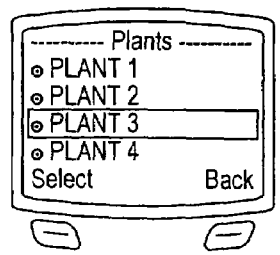
FIGS. 4A, 4B and 4C illustrate a hierarchic WWW pages for selection of the field device.
Figure 4B:
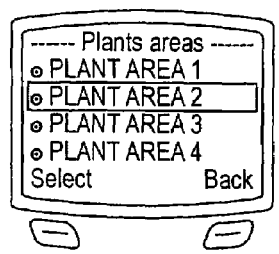
Figure 4C:
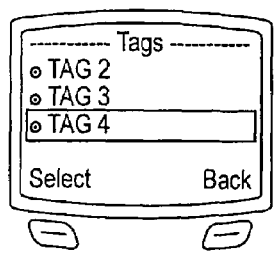

In an embodiment of the invention the WWW server 23 or 33 is arranged to assist the selection of the desired field device by providing a hierarchic set of WWW pages representing the logical, functional or location architecture of the plant in a tree configuration. As a consequence, the user of the mobile terminal MT is able to proceed from the higher hierarchic level to a lower one by selections made in this hierarchic set of WWW pages. An example of hierarchic WWW pages is illustrated in FIGS. 4A, 4B and 4C. Let us assume that the device database 22 is built up of, for example, three levels: plant—plant area—tag. The WWW server 23 or 33 utilizes these three levels for creating of hierarchic set of WWW pages that the MT is able to browse.

A WWW page for the level "plant" is shown in FIG. 4A. The WWW page shows four plants 1, 2, 3 and 4 from which the user is able to select. The user selects the plant in which the desired field device is located, and thereby proceeds to the next lower hierarchic level: "plant areas". As a consequence, the server 23 or 33 creates a WWW page showing the plant areas for the selected plant, as illustrated in FIG. 4B. The new page is forwarded to the mobile terminal MT and displayed on the display of the MT. Again the user selects from the plant area list the plant area in which the desired field device is located, and thereby proceeds to the next lower hierarchic level: "tags". The server 23 or 33 creates a new WWW page listing the tags in the selected plant area, and the new WWW page is forwarded to MT and displayed to the user. Now the user selects the desired tag in the list, and thereby finally proceeds to the WWW page of the desired field device. The tag is a unique code used for identification of each field device in the plant, and it is also used everywhere in the automation system and process diagrams. The tag code is also normally indicated in the field device so it is the most convenient and unambiguous way to identify the field device in the wireless remote control according to the present invention.

Figure 5A:
FIGS. 5A and 5B illustrate the WWW pages for selecting a field device by means of a search criterion.
Figure 5B:
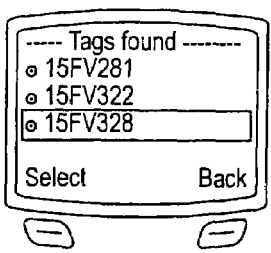

In another embodiment of the invention the WWW server 23 or 33 is provided with a search machine or search function. This is illustrated in FIGS. 5A and 5B. When the user has selected the search function, a WWW page is created and displayed to the user. The user is prompted to input the tag of the field device or part of it. In case the inputted tag is unambiguous, the web server will directly create a WWW page of the respective field device. However, if the inputted tag is ambiguous, such as the truncated tag in FIG. 5A, the server 23 or 33 creates a new WWW page showing all tags which may match to the inputted tag, as shown in FIG. 5B. The user is now able to select the desired tag in the list and will thereby proceed to the WWW page of the respective field device.

Figure 6:
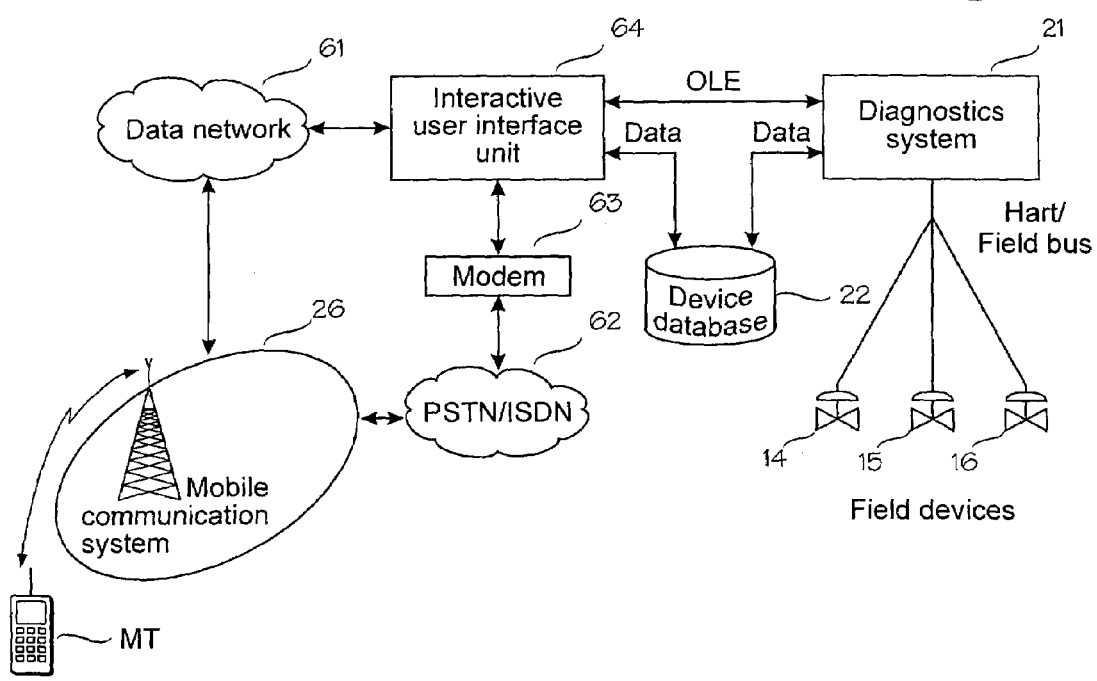
FIG. 6 illustrates the embodiments of the present invention in which the mobile terminal is connected to the interactive user interface by means of a modem connection or via a data network.

The WWW approach is probably the most flexible and easiest way to embody the present invention. However, the present invention is not intended to be limited to the internet/ intranet environment. On the contrary, the interactive user interface may be embodied to support various access methods from the mobile terminal MT, such as a data connection through the mobile communication network 26 and a data network 61, or a modem connection via the mobile communication network 26, PSTN/ISDN 62 and modem 63, as illustrated in FIG. 6. The diagnostic system 21, the device database 22 as well as the interface between the diagnostic system 21 and interactive user interface 64 may be similar to those in FIGS. 2 and 3. The only main difference is a content format and protocols utilized by the interactive user interface unit 64 towards the mobile terminal MT. These protocols and contents formats can be selected according to the type of the data connection and the control application used in the mobile terminal MT. However, despite the content format, the unit 64 utilizes the device database 22 for updating the content of the user interface and for creating the commands to the diagnostic system according to the same principles used in the WWW embodiments described above. However, the disadvantage of this approach may be a need for special purpose applications in the mobile terminal MT and in the interactive user interface unit, whereas in the WWW approach the standard internet solutions can be used for a communication between the mobile terminal and the interactive user interface.

It is obvious that, as the technique develops, the basic idea of the invention may be implemented in many different ways. Consequently, the invention and its embodiments are not restricted to the above examples, but they can vary within the scope of the attached claims.

What is claimed is:

1. A control system for controlling, configuring or monitoring field devices in an industrial process, said control system being connected to a plurality of field devices and comprising:
   at least one mobile terminal arranged to communicate with the control system over a cellular communication system in order to selectively remotely control, configure or monitor the field devices; and
   an interactive user interface associated with the control system, said user interface utilizing configuration, control and management data maintained in at least one database of the control system and being accessible by the mobile terminal through a dedicated data connection established over the cellular communication system, in order to selectively control, configure or monitor the field devices connected to the control system, said interactive user interface being configured to modify content of the interactive user interface in response to requests or selections made by the mobile terminal and based on the configuration, control and management data retrieved from said at least one database of the control system, and to create control or configuration commands to the control system in response to selections or inputs made by the mobile terminal user in the interactive user interface.

2. The system as claimed in claim 1, wherein said control system controls or configures the field devices according to the commands from the interactive user interface.

3. A control system for controlling, configuring or monitoring field devices in an industrial process, said control system being connected to a plurality of field devices and comprising:
   at least one mobile terminal arranged to communicate with the control system over a cellular communication system in order to selectively remotely control, configure or monitor the field devices; and
   an interactive user interface associated with the control system, said user interface utilizing configuration, control and management data maintained in at least one database of the control system and being accessible by the mobile terminal through a dedicated data connection established over the cellular communication system, in order to selectively control, configure or monitor the field devices connected to the control system, wherein the identity of the field device is a tag number of the field device.

4. A control system for controlling, configuring or monitoring field devices in an industrial process, said control system being connected to a plurality of field devices and comprising:
   at least one mobile terminal arranged to communicate with the control system over a cellular communication system in order to selectively remotely control, configure or monitor the field devices;
   a World Wide Web (WWW) server associated with the control system,
   said WWW server utilizing configuration, control and management data maintained in at least one database of the control system for providing at least one interactive WWW page which is accessible through a TCP/IP network and a data connection between the mobile terminal and an access server connected to the TCP/IP network; and
   a browser in the mobile terminal for interacting with the interactive WWW page through said data connection, access server and the TCP/IP network, in order to selectively control, configure or monitor the field devices connected to the control system, wherein
   the WWW server comprises a search function which, in response to an identity of a field device sent from the mobile terminal, searches the WWW page of the respective field device.

5. The system as claimed in claim 4, wherein the search function is responsive to a truncated or ambiguous identity sent by the mobile terminal for displaying a list of field devices to which the truncated or ambiguous identity matches.

6. The system as claimed in claim 4, wherein said WWW server is configured to modify the content of the interactive WWW pages in response to requests or selections made by the mobile terminal and based on the configuration, control and management data of said at least one database of the control system, and to create control or configuration commands to the control system in response to selections or inputs made by the mobile terminal user in the interactive WWW pages.

7. The system as claimed in claim 4, wherein a Wireless Application Protocol (WAP) is used between the access server and the mobile terminal, and a WWW protocol is used between the access server and the WWW server.

8. A control system for controlling, configuring or monitoring field devices in an industrial process, said control system being connected to a plurality of field devices and comprising:
at least one mobile terminal arranged to communicate with the control system over a cellular communication system in order to selectively remotely control, configure or monitor the field devices;
a World Wide Web (WWW) server associated with the control system,
said WWW server utilizing configuration, control and management data maintained in at least one database of the control system for providing at least one interactive WWW page which is accessible through a TCP/IP network and a data connection between the mobile terminal and an access server connected to the TCP/IP network;
a browser in the mobile terminal for interacting with the at least one interactive WWW page through said data connection, access server and the TCP/IP network, in order to selectively control, configure or monitor the field devices connected to the control system, wherein
said WWW server is configured to modify content of the at least one interactive WWW page in response to requests or selections made by the mobile terminal and based on the configuration, control and management data in said at least one database of the control system, and to create control or configuration commands to the control system in response to selections or inputs made by the mobile terminal user in the at least one interactive WWW page.

9. The system as claimed in claim 8, wherein the WWW server is arranged to assist the selection of a desired field device by providing a hierarchic set of WWW pages representing logical, functional or location architecture of the plant in a tree configuration, the user of the mobile terminal being able to proceed from a higher hierarchic level to a lower hierarchic level by selection made on the higher level.

10. The system as claimed in claim 9, wherein the WWW page on the highest hierarchical level displays a list of plants or plant areas for user selection, the next lower level displays a list of plant areas within the plant or plant area selected at the highest level, etc., the second lowest level displays a list of field devices in the plant area selected on a next higher level, and the lowest level displays a WWW page for the desired field device.

11. The system as claimed in claim 9, wherein the WWW server is provided with a search function which in response to an identity of a field device sent from the mobile terminal searches the WWW page of the respective field device.

12. The system as claimed in claim 8, wherein a Wireless Application Protocol (WAP) is used between the access server and the mobile terminal, and a WWW protocol is used between the access server and the WWW server.

13. The system according to claim 8, wherein the identity of the field device is a tag number of the field device.

* * * * *